Nov. 22, 1955    R. G. KAMPS    2,724,450
MOTOR VEHICLE EQUIPPED WITH JET NOZZLES
Filed July 21, 1951    3 Sheets-Sheet 1

Witnesses:

Inventor:
Reinhold G. Kamps
By Austin, Dicke, Wilhelm & Pedlow
Attorneys

Nov. 22, 1955 R. G. KAMPS 2,724,450
MOTOR VEHICLE EQUIPPED WITH JET NOZZLES
Filed July 21, 1951 3 Sheets-Sheet 2

Witnesses:

Inventor:
Reinhold G. Kamps
By Austin, Wicke, Wilhelm & Vadlow
Attorneys

Nov. 22, 1955  R. G. KAMPS  2,724,450
MOTOR VEHICLE EQUIPPED WITH JET NOZZLES
Filed July 21, 1951  3 Sheets-Sheet 3

Witnesses:

Inventor:
Reinhold G. Kamps
By Austin, Hicke, Wilhelm & Pedlow
Attorneys

United States Patent Office 2,724,450
Patented Nov. 22, 1955

2,724,450

MOTOR VEHICLE EQUIPPED WITH JET NOZZLES

Reinhold G. Kamps, Stuttgart-Bad Cannstatt, Germany, assignor to Daimler-Benz Aktiengesellschaft, Stuttgart-Unterturkheim, Germany Application July 21, 1951, Serial No. 237,870

Claims priority, application Germany July 21, 1950

3 Claims. (Cl. 180—54)

My invention relates to a motor vehicle equipped with jet nozzles and, more particularly, to motor race cars.

It is the object of the present invention to improve the efficiency of motor race cars or other vehicles provided with high powered engines by utilizing the energy of the exhaust gases. It is another object of my invention to afford simple and effective means which will brace a motor race car in curves against the effect of the centrifugal force and/or to afford improved means which will act automatically to propel the car when driving on a straight course and to brace the car against centrifugal forces when travelling through curves.

The aforestated objects are achieved by providing the vehicle and, more particularly, a motor race car with jet nozzles fed by the exhaust gases of the engine and thus adapted to produce a thrust. In a preferred embodiment of the invention the thrust nozzles are so swingable as to permit of utilizing the thrust at the option of the driver either to increase the propelling power of the engine or to brace the car in curves against the effect of the centrifugal forces.

Further objects of the present invention will appear from the description of a number of preferred embodiments described hereinafter and the features of novelty will be pointed out in the claims.

Figure 1:
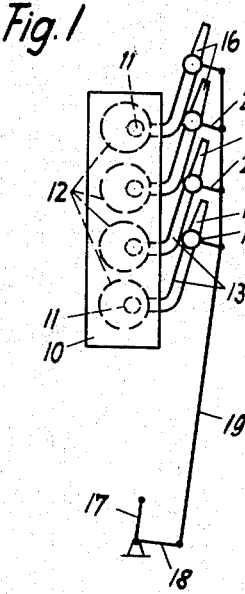
Fig. 1 is a plan view of the driving engine of a motor race car equipped with adjustable exhaust jet nozzles.

In Fig. 1 a multi-piston internal combustion engine 10 is shown diagrammatically as being mounted in the rear of a race car, the body and the wheels of the latter being omitted for sake of simplicity. The cylinders 12 are provided with outlet valves 11. Moreover, the car is equipped with jet nozzles 16 which communicate individually through exhaust pipes 13 with the outlet valves 11 to be fed with the exhaust gases issuing therefrom. Each of the exhaust pipes 13 extends from the chamber accommodating the valve 11 in the conventional manner laterally out of the cylinder head, then rearwardly, and terminates in a vertical section indicated at 15 in Figs. 1 and 2. The section 15 of the exhaust pipe 13 extends downwardly into the space beneath the engine, i. e., into the road clearance space of the car. On the lower end of the section 15 of each exhaust pipe 13 a jet nozzle 16 is mounted which is adapted to produce a substantially horizontal thrust. Preferably, the jet nozzles 16 are pivotally mounted for adjustment about the axis of the section 15 of the exhaust pipe 13 thus enabling each jet nozzle 16 to be either directed rearwardly for the purpose of producing a forward thrust adding to the propelling power of the engine, or directed sideways so that the thrust produced will brace the vehicle in curves against the centrifugal force. In the embodiment illustrated in Fig. 1, a lever 17 mounted in the driver's cockpit for convenient operation has an arm 18 which is connected by a rod 19 with arms 20 attached to the nozzles 16. In this manner, the operator may readily turn all of the nozzles 16 in any desired direction, the nozzles being always kept in parallel relationship by the arms 20 and the rod 19. In order to prevent mutual interference of the nozzles, each nozzle is preferably knee-shaped having one leg 21 extending substantially vertically and another leg 22 which is slightly downwardly inclined so as to clear the adjacent jet nozzle upon rotation. In the embodiment shown in Fig. 1, the section 15 of the exhaust pipe constitutes the means for pivotally mounting leg 21 to be adjustable about its vertical axis. When the car is travelling in a straight course, the driver will adjust the jet nozzles so as to direct their legs 22 rearwardly causing the pressure of the jets of exhaust gases to produce a forwardly directed thrust contributing to the driving power which is produced in the orthodox manner by means gearing the engine 10 to the front or the rear wheels of the car, or to both. When the car, however, travels in a curve, the driver will direct the nozzles 16 outwardly so as to cause the thrust to brace the vehicle against the centrifugal force. As a result, the car may be driven through curves at a higher speed than it would be feasible in the absence of the jet nozzles. The transverse thrust produced by the nozzles will not only reduce the transverse component of the traction effective between the tires and the road but will also tend to tilt the car inwardly thereby increasing the load acting upon the wheels on the inside of the curve and the consequent adhesion of such wheels thus permitting of the transfer to the driven wheels of an increased driving or braking couple.

Figure 2:
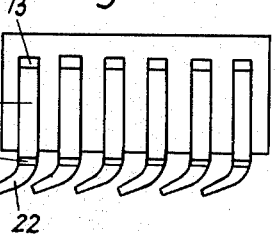
Fig. 2 is an elevation viewed from the left of Fig. 1, the jet nozzles opening into the road clearance space of the car.
Figure 3:
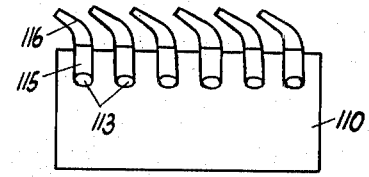
Fig. 3 shows an elevation of a modified embodiment in which the jet nozzles open into the atmosphere above the top of the motor car.

In the embodiment illustrated in Fig. 3 the exhaust pipes 113 are bent upwardly. The jet nozzles 116 mounted on the upper ends of the vertical sections 115 of the exhaust pipes being thus located above the engine 110 open into the atmosphere above the motor hood of the vehicle. With that arrangement the lateral tilting couple exerted by the thrust upon the car in the curve will be higher than with the arrangement shown in Fig. 2. Since, however, the jets of exhaust gases are liable to inconvenience the driver, the modification shown in Fig. 3 is to be preferred in race cars in which the engine is mounted in the rear behind the driver. It is to be understood, of course, that the nozzle 116 are pivotally mounted on the sections 115 of the exhaust pipes 113 and connected with a suitable linkage such as 17, 18, 19, 20 for adjustment.

Figure 4:
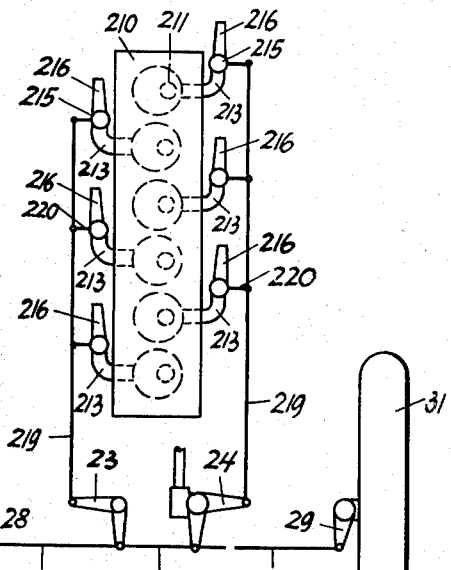
Fig. 4 is a plan view of the front end of a car, the body or frame being omitted, showing a steering linkage and jet nozzles adjustable thereby.

The rod 19 may be connected with the steering linkage for automatic adjustment of the nozzles. Such a modification of my invention is illustrated in Fig. 4 showing a multi-cylinder engine 210 in which exhaust valves diagrammatically indicated at 211 communicate with exhaust pipes 213 extending sideways and downwardly or upwardly. On the vertical sections 215 of the exhaust pipes 213 there are pivotally mounted the adjustable jet nozzles 216. In the embodiment shown in Fig. 4, alternate exhaust pipes 213 extend in opposite directions, whereby one group of pipe section 215 is located on one side of the engine block and the other group of pipe section 215 is located on the other side of the engine block. The nozzles 216 may be either located at a lower level or at a higher level than the engine, as shown in Fig. 2 or in Fig. 3.

Arms 220 of the nozzles are connected to rods 219 which, in their turn, are linked to the steering linkage of the race car. As diagrammatically shown, the steering linkage includes a pair of bell cranks 23, 24 which are connected by links 25, 26 and 27 to the steering arms 28 and 29 of the front wheels 30 and 31. Preferably, the various elements are so dimensioned that the nozzles 216 are turned rearwardly when the vehicle is travelling in a straight course and outwardly when the vehicle is in a curve. When the steering linkage is in one or the other of its end positions, the nozzles are preferably swung to a position at a right angle with respect to the longitudinal axis of the car.

Figure 8:
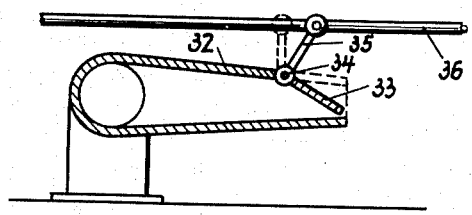
Fig. 8 is a horizontal section through an exhaust nozzle along the line 8—8 of Fig. 6 showing adjustable means for varying the width of the nozzle.

While the nozzles 16 or 116 or 216 may have fixed cross sections, I prefer to provide means for varying the width of the nozzle so that the latter may conform to the stream of exhaust gases available at any time. Numerous means for changing the width of the nozzle are well known to anyone skilled in the art. However, a very simple mechanism serving that purpose is illustrated in Fig. 8. The side wall 32 of the nozzle is recessed and in the recess a flap 33 is inserted, the flap being hinged at 34 to the wall 32 and provided with an arm 35. The latter is connected to a link 36 and thus adapted to be rocked by lengthwise displacement of the link. When the flap 33 assumes the position shown in Fig. 8 in dotted lines, the nozzle is adjusted for full power in which the maximum quantity of exhaust gases is available. When the engine is throttled so as to reduce the quantity of exhaust gases, the flap is swung inwardly towards the position shown in Fig. 8. The link 36 may be connected to a handle located in the cockpit for manual adjustment or may be connected to a member controlling the power of the engine, for instance to an accelerator pedal.

Figure 6:
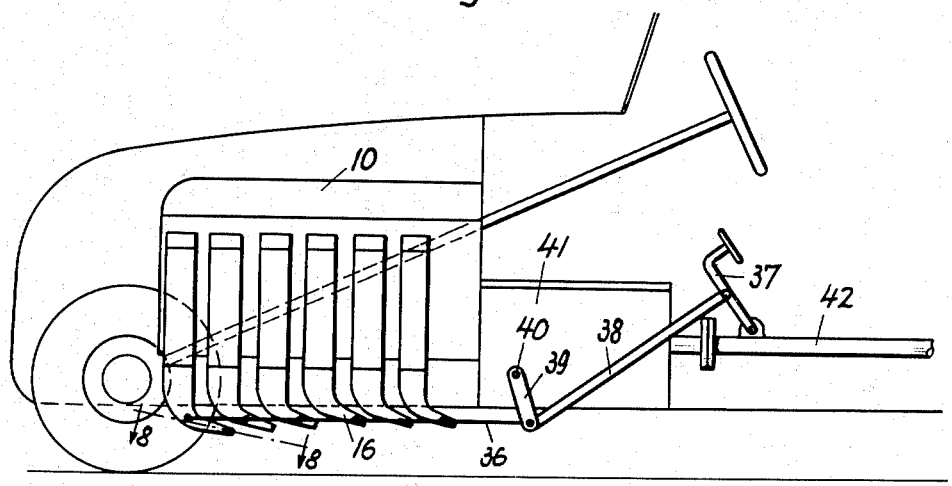
Fig. 6 shows a partial elevation of a race car provided with exhaust jet nozzles opening into the road clearance space.

Such a modification of my invention is illustrated in Fig. 6 in which the link 36 is shown as being connected to an accelerator pedal 37 by a rod 38 and an arm 39 suitably pivoted at 40 to the transmission 41 of the engine 10 driving the rear wheels of the race car through the transmission 41 and the universal shaft 42. The nozzles 16 are concurrently and simultaneously adjustable by the link 36 in the manner shown in Fig. 8.

The reduction of the width of the nozzle coincidental to a reduction of the power produced by the engine will be effective to maintain a comparatively high pressure within the exhaust pipes, such as 13, and a high thrust entailed thereby.

Figure 8A:
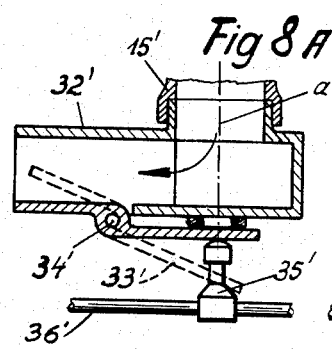
Fig. 8A is a vertical axial section of an adjustable nozzle.
Figure 8B:
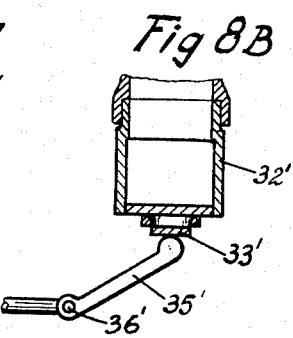
Fig. 8B is a section through the adjustable nozzle shown in Fig. 8A taken at right angles thereto.

In Figs. 8A and 8B a rotatable nozzle of adjustable width is shown. The horizontal nozzle 32' is mounted for rotation about the vertical axis $a$ of the exhaust pipe 15'. The width of the nozzle is adjustable by angular adjustment of a flap similar to flap 33 shown in Fig. 8 which is hinged at 34' to the side walls of the nozzle 32'. For the purpose of adjustment of the flap, the same is provided with an arm 33' which extends from the pivot 34' to the right with reference to Fig. 8A and intersects the axis $a$ overlying an arm 35' fixed to a shaft 36'. A spring (not shown) tends to turn the flap in clockwise direction with reference to Fig. 8A thereby holding the arm 33' of the flap in engagement with the arm 35', irrespective of the angular position of the same. The point of engagement of arm 33' with the arm 35' substantially coincides with the axis $a$. Therefore, the width of the nozzle may be adjusted by rotation of shaft 36' and such adjustment will not be materially affected by an angular adjustment of nozzle 32' about the axis $a$.

Figure 5:
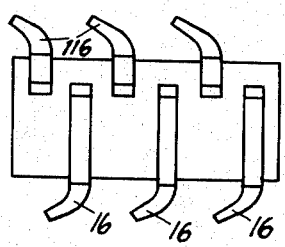
Fig. 5 shows an elevation of the engine illustrated in Fig. 4, the linkage for adjusting the nozzles being omitted.

In Fig. 5 an embodiment is illustrated in which some of the exhaust valves communicate with nozzles 116 opening into the atmosphere above the motor hood of the race car, while the other exhaust valves communicate with nozzles 16 opening into the road clearance space beneath the engine.

Figure 7:
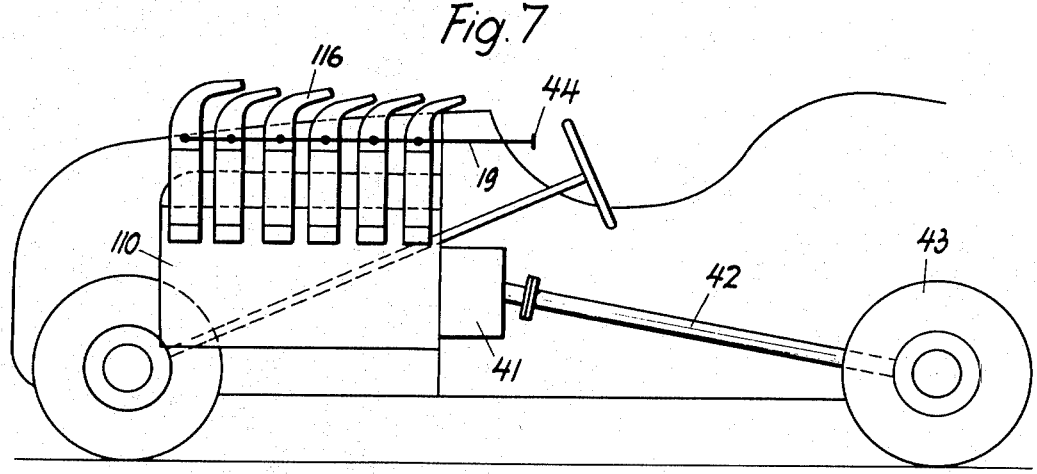
Fig. 7 is a view similar to that of Fig. 6 of a modified motor race car in which the exhaust jet nozzles open into the atmosphere above the top of the motor hood.

Fig. 7 shows the race car equipped with the engine 110 illustrated in Fig. 3. As explained with reference to Fig. 6 the engine 110 drives the rear wheels 43 through a transmission 41 and universal shaft 42 and, in addition, produces a driving force by means of the jet nozzles 116 which are adjustable by a link 19 which may be manually set by a handle 44 or may be connected with the steering linkage, as described with reference to Fig. 4.

Figure 9:
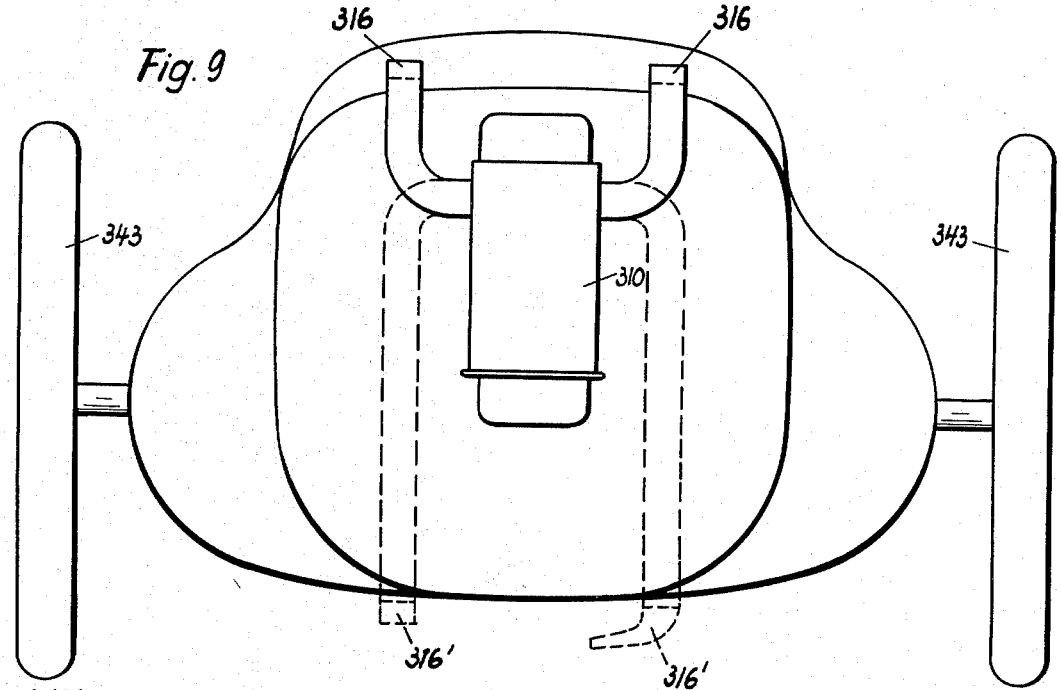
Fig. 9 is a front view of a modified motor race car equipped with a driving engine having four sets of exhaust jet nozzles.

Fig. 9 is the rear view of a race car equipped with an engine 310 mounted in the rear end of the body and adapted through a suitable transmission not shown to drive rear wheels 343 and to produce additional driving power through thrust nozzles 316 and 316'. In the present embodiment, the nozzles have a rectangular cross section for the purpose of easier adjustment of their width. While the nozzles 316 are arranged in the manner described with reference to Fig. 3, the nozzles 316' co-ordinated to other cylinders than the nozzles 316 are arranged in the manner described with reference to Fig. 2. One of the two nozzles 316' is shown as being swung sideways as in a curve.

A race car multi-cylinder engine having a total piston displacement of about 200 cubic inches and a maximum power of about 500 H. P. will be capable by means of the jet nozzles described, of producing a maximum thrust of about 70 lbs. By reducing the width of the nozzles such thrust may be considerably increased or may be kept within the limits from 30 to 70 lbs. when the engine is throttled. At a speed of 125 M. P. H. a jet thrust of 60 lbs. produces an additional driving power output of approximately 50 H. P. Since such energy will directly drive the car without being transferred through a transmission, wheels and tires, such 50 H. P. will be considerably more effective than they would be if produced by the engine in the orthodox manner and transferred to the driven wheels of the car.

While the invention is primarily intended for high speed vehicles, such as race cars, it is equally applicable to other vehicles. It will be readily appreciated that the invention affords a valuable possibility of contributing additional driving power to the power transferred from the engine through the transmission to the wheels and tires when the vehicle is travelling in a straight course, and that the invention will also afford a possibility of increasing the speed when the vehicle is travelling in a curve. Heretofore the maximum speed permissible when travelling in a curve was limited by the centrifugal forces which are proportional to the weight of the car. Therefore, on a curving road, the maximum driving speed could not be fully utilized. A reduction of the speed in curves compels the driver, however, to use a maximum of acceleration and deceleration before and after any curve thus increasing the wear of the tires. Therefore, the present invention by affording a possibility of increasing the permissible speed in curves will considerably reduce such wear thus constituting a valuable contribution to the art.

Having now described a number of preferred embodiments of my invention I wish it to be clearly understood that the latter is not limited to the details of such embodiments but is capable of numerous modifications within the scope of the appended claims.

What I claim is:

1. In a motor vehicle having wheels including at least one steerable front wheel, an internal combustion engine adapted to drive certain of said wheels, equipped with exhaust passages, jet nozzles communicating with said exhaust passages, means for mounting said jet nozzles being adjustable about substantially vertical axes and capable of being directed either rearwardly or laterally, a steering linkage co-ordinated to the said front wheel of said vehicle, and means connecting said steering linkage to said nozzles for swinging the latter in the same sense as the front wheels of said vehicle but through a larger angle than the said steerable wheel and for directing said nozzles rearwardly when said steering wheels are straightened and sideways when said vehicle is travelling in a curve.

2. In a motor vehicle, the combination comprising an internal combustion engine adapted to produce exhaust gases, a jet nozzle mounted for pivotal motion about a substantially vertical axis, pivotal front wheels, a steering linkage connected with said front wheels, and means connecting said nozzle to said steering linkage and adapted to direct said nozzle rearwardly when said front wheels are straightened and outwardly when said front wheels are swung into a curve, whereby the thrust produced by said jet nozzle will propel the vehicle on a straight course and will brace the vehicle in a curve.

3. In a racing motor car, the combination comprising an internal combustion piston engine having a plurality of exhaust valves and adapted to drive wheels of said car, at least one row of knee-shaped nozzles co-ordinated to said exhaust valves to be fed with the exhaust gases issuing therefrom and mounted beneath said engine to open into the road clearance space of said vehicle, one leg of each nozzle extending substantially vertically and the other leg being slightly downwardly inclined so as to clear the adjacent jet nozzle upon rotation, means for pivotally mounting said first mentioned leg to be adjustable about its vertical axis, steering means, and means connecting the latter with said nozzles and adapted to turn same rearwardly when the vehicle is travelling in a straight course and outwardly in curves.

References Cited in the file of this patent

UNITED STATES PATENTS

| | | |
|---|---|---|
| 980,382 | Willis | Jan. 3, 1911 |
| 1,290,669 | Schmidt | Jan. 7, 1919 |
| 2,342,262 | Franz et al. | Feb. 22, 1944 |
| 2,370,062 | Mercier | Feb. 20, 1945 |
| 2,372,058 | Campbell | Mar. 20, 1945 |
| 2,397,654 | Forsyth | Apr. 2, 1946 |

FOREIGN PATENTS

| | | |
|---|---|---|
| 14,536 | France | Oct. 19, 1911 |
| 833,256 | France | July 18, 1938 |
| 572,724 | Great Britain | Oct. 22, 1945 |